Patented June 30, 1936

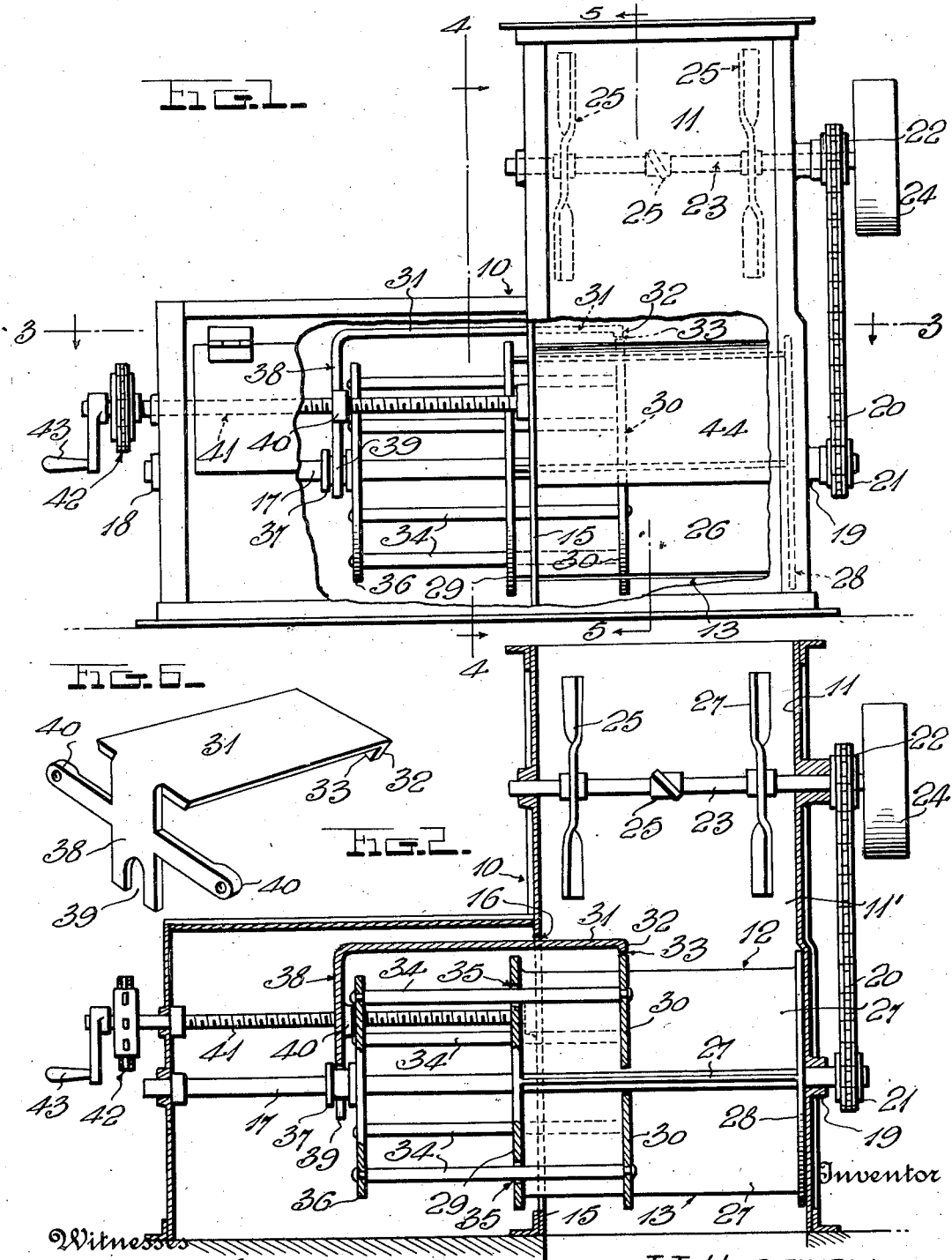

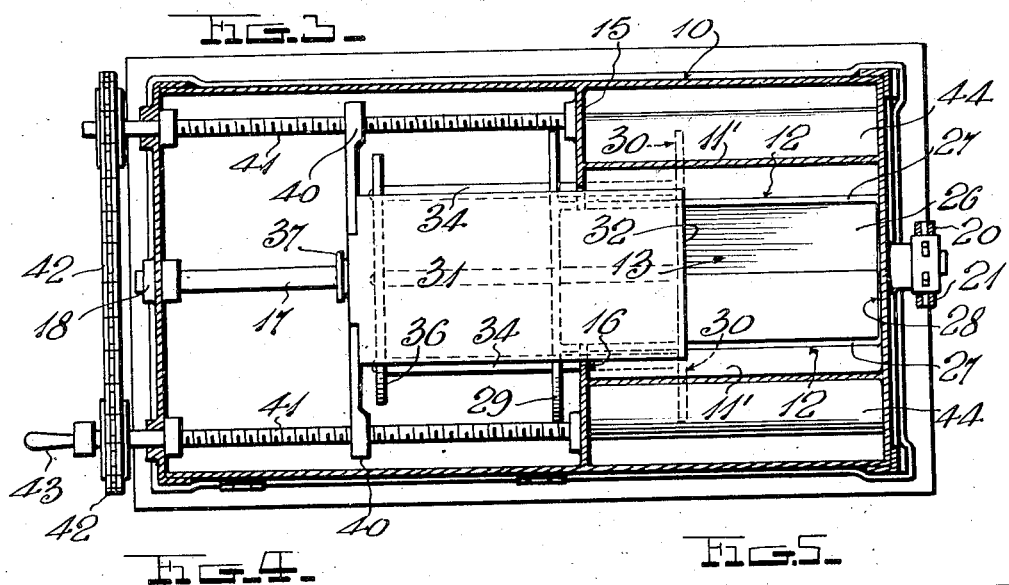
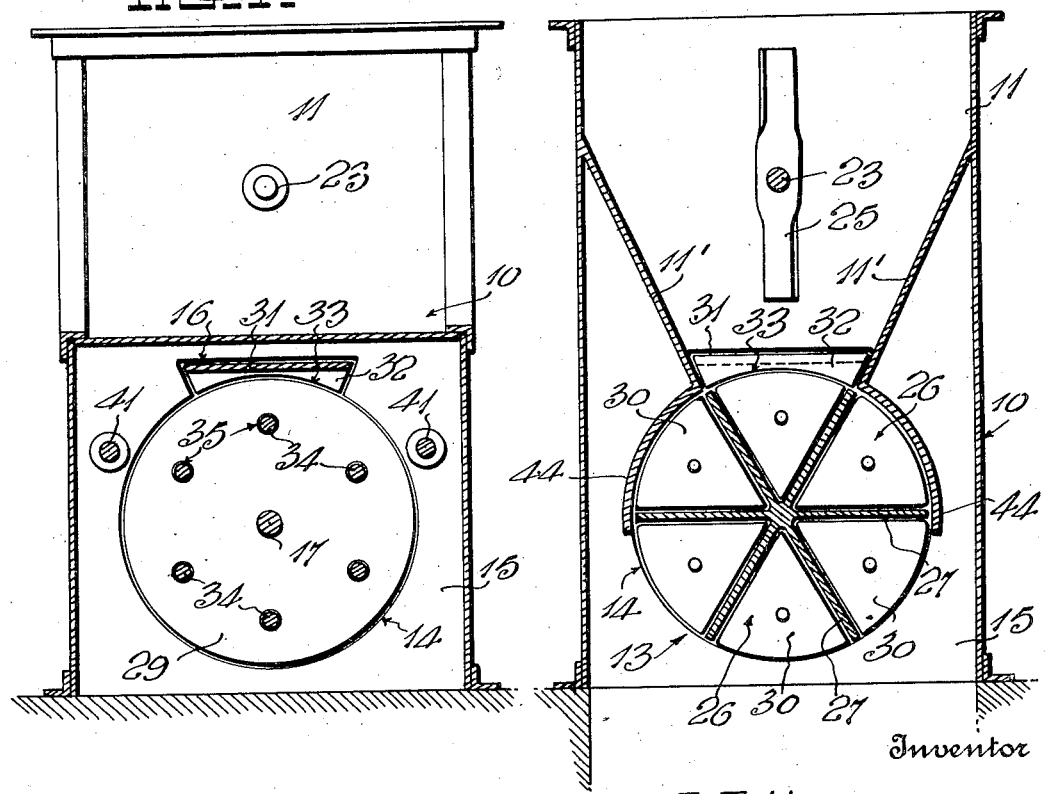

2,045,709

UNITED STATES PATENT OFFICE 2,045,709

MATERIAL FEEDER

Jesse J. Hartwell, Hutchinson, Kans.

Application February 9, 1935, Serial No. 5,812

2 Claims. (Cl. 83—44)

The invention relates to a mechanism for continually feeding material such as grain, flour, ground feed, etc., at a uniform rate, the machine being of particular advantage in blending flour or in blending grain from which flour is to be ground.

It is the object of the invention to provide an exceptionally simple and inexpensive, yet an efficient and desirable feeding machine which is readily adjustable to feed more or less material, as may be required.

With the foregoing in view, the invention resides in the novel subject matter hereinafter described and claimed, description being accomplished by reference to the accompanying drawings.

Fig. 1 is a side elevation, partly broken away.

Fig. 2 is a central, vertical longitudinal sectional view.

Fig. 3 is a horizontal section on line 3—3 of Fig. 1.

Figs. 4 and 5 are vertical transverse sectional views on lines 4—4 and 5—5 of Fig. 1.

Fig. 6 is a detail perspective view of the shield plate and the shifting member to which it is connected.

A preferred construction has been illustrated in the drawings and will be rather specifically described, with the understanding that within the scope of the invention as claimed, variations may be made.

An L-shaped casing 10 is provided whose vertical portion 11 constitutes a hopper for the material to be fed, the lower end portion of this hopper being provided with downwardly converging side walls 11' whose lower ends are spaced apart to provide a slot 12 for discharging the material to a feeding rotor 13 which is mounted on a horizontal axis within the casing directly below the hopper. The inner end of this rotor 13 preferably extends through an opening 14 in a fixed vertical wall 15 which extends across the horizontal portion of the casing 10 at its juncture with the vertical portion of said casing. At its top, the opening 14 is preferably of the dove-tail form shown at 16, for a purpose to appear.

The rotor 13 is carried by a horizontal shaft 17 which extends longitudinally through the lower portion of the casing 10, said shaft being rotatably mounted in appropriate bearings 18 and 19. In the present showing, the shaft 17 is driven by a chain 20 and sprockets 21 and 22 from an upper shaft 23 extending through the hopper 11, said shaft 23 being provided with a driving pulley or the like 24 and being equipped with agitators 25 for continually loosening the hopper-contained material.

The rotor 13 is provided with peripheral pockets 26 formed between radial plates 27 which project from the shaft 17, the ends of said plates being secured to disks 28 and 29. Within these pockets 26 are transverse partition plates 30 which constitute shiftable inner end walls for said pockets. A shield plate 31 is provided over the rotor 13 to prevent any material from descending from the hopper 11 into the spaces between the partition plates 30 and the disk 29 at the inner end of the rotor, but as said rotor rotates, the material from the hopper enters the exposed portions of said pockets between the partition plates 30 and the outer disk 28, said material being fed by these pocket portions to the lower portion of the machine from which it discharges to any desired machine, or to conducting means leading to a machine or the like. Provision is made for adjusting the partition plates 30 longitudinally of the rotor 13 to vary the size of the material feeding portions of the pockets 26 as occasion may demand, and provision is made for simultaneously shifting the shield plate 31 to the same extent. In the present disclosure, this shield plate passes slidably through the dove-tail portion 16 of the opening 14 and is thus held against any movement circumferentially of the rotor 13, although being free to move longitudinally of said rotor. The inner end 32 of the shield plate 31 is preferably in the form of a downturned flange having a curved lower edge 33 cooperable with the peripheral edges of the partition plates 30 in forming a running connection between said shield plate and said partition plates.

Longitudinal rods 34 are provided in the present disclosure for adjusting the partition plates 30, said rods passing slidably through openings 35 in the disk 29 and being secured at their inner ends to said partition plates 30. The outer ends of these rods are secured to a shiftable disk 36 which is slidable upon the shaft 17, said disk being provided with a peripherally grooved hub 37. A shifting member 38 is provided for shifting the member 36 longitudinally of the shaft 17, said shifting member 38 being shown in the form of a cross-like plate having a vertical body portion whose lower end is provided with a fork 39 engaging the hub 37 to establish a running connection between said plate and hub, said body portion being provided with lateral oppositely projecting arm portions having nuts 40 at their ends. The upper end of the aforesaid body portion of the member 38 is connected with the outer end of the shield plate 31, being preferably integral therewith as shown. The nuts 40 engage screws 41 which are suitably mounted in the horizontal portion of the casing 10, said nuts being preferably integral with the arm portions and the latter being preferably integral with the body portion of the member 38. The screws 41 are connected by a chain and sprockets, indicated in a general way at 42, so that they must rotate together, at least one of said screws being provided with a hand crank or the like 43. When this crank or the like is rotated, both screws 41 are driven, thereby moving the shifting member 38 toward or from the rotor 13, with the result that the partition plates 30 and the shield plate 31, are simultaneously adjusted to the same extent. Rotation of the rotor 13 causes the exposed portions of the pockets 26 to downwardly feed the material from the hopper 11, and adjustment of the feed may be effected at any time without stopping the machine.

Somewhat arched guard plates 44 are preferably provided at the upper peripheral portion of the rotor 13, these guard plates being connected at their upper edges with the lower edges of the side walls 11' of the hopper 11.

It will be seen from the foregoing that novel and advantageous provision has been made for attaining the desired end but attention is again invited to the possibility of making variations.

I claim:

1. In a machine of the class described, a rotatably mounted shaft, two end disks secured on said shaft, radial plates between and secured to said end disks to provide a rotor having peripheral pockets, one of said disks being provided with circumferentially spaced openings between said radial plates, rods parallel with the shaft and passing slidably through said openings, transverse segmental partition plates in said pockets secured to and carried by the inner ends of said rods, said partition plates having peripheral edges concentric with said shaft, a third disk secured to the outer ends of said rods and having a hub slidable on said shaft, a slidably mounted non-rotatable shield plate at the periphery of said one end disk and said third disk and extending over the portions of said pockets between said one end disk and said partition plates, one end of said shield plate being in running contact with said peripheral edges of said partition plates, and means for adjusting said shield plate and said third disk longitudinally of the shaft to vary the effective size of said pockets.

2. In a machine of the class described, a rotatably mounted shaft, two end disks secured on said shaft, radial plates between and secured to said end disks to provide a rotor having peripheral pockets, one of said end disks being provided with circumferentially spaced openings between said radial plates, rods parallel with the shaft and passing slidably through said openings, transverse segmental partition plates in said pockets secured to and carried by the inner ends of said rods, said partition plates having peripheral edges concentric with said shaft, a third disk secured to the outer ends of said rods and having a peripherally grooved hub slidable on said shaft, a slidably mounted non-rotatable shield plate at the periphery of said one end disk and said third disk and extending over the portions of said pockets between said one end disk and said partition plates, one end of said shield plate being in running contact with the peripheral edges of said partition plates, a shifting plate secured to the other end of said shield plate and having its lower end engaged with the peripherally grooved hub of said third disk, said shifting plate having oppositely projecting arms whose outer ends are provided with nuts, two screws rotatably mounted in parallel relation with said shaft and threaded through said nuts, and means for simultaneously rotating both of said screws to effect adjustment of said shield plate and said partition plates longitudinally of said pockets.

JESSE J. HARTWELL.